(12) United States Patent
Bialek et al.

(10) Patent No.: US 7,947,322 B2
(45) Date of Patent: *May 24, 2011

(54) LOW CARBOHYDRATE FIBER CONTAINING EMULSION

(75) Inventors: Jadwiga Malgorzata Bialek, Elstow (GB); Leonardo Jose Sanchez Aquino, Jersey City, NJ (US); Penelope Eileen Knight, Raunds (GB)

(73) Assignee: Unilever Bestfoods, North America division of CONOPCO, Inc., Englewood Cliffs, NJ (US)

( * ) Notice: Subject to any disclaimer, the term of this patent is extended or adjusted under 35 U.S.C. 154(b) by 128 days.

This patent is subject to a terminal disclaimer.

(21) Appl. No.: 12/369,112

(22) Filed: Feb. 11, 2009

(65) Prior Publication Data
US 2009/0148585 A1    Jun. 11, 2009

Related U.S. Application Data

(63) Continuation of application No. 10/693,474, filed on Oct. 24, 2003, now Pat. No. 7,510,737.

(51) Int. Cl.
*A23D 7/00* (2006.01)
*A23L 1/052* (2006.01)

(52) U.S. Cl. ........................ 426/602; 426/605

(58) Field of Classification Search .................. 426/602
See application file for complete search history.

(56) References Cited

U.S. PATENT DOCUMENTS

| | | | |
|---|---|---|---|
| 3,676,157 A | 7/1972 | Wintersdorff | |
| 4,225,628 A | 9/1980 | Lynn | |
| 4,923,981 A | 5/1990 | Weibel et al. | |
| 4,997,665 A | 3/1991 | Grethlein | |
| 5,011,701 A | 4/1991 | Baer et al. | |
| 5,385,748 A | 1/1995 | Bunger et al. | |
| 5,441,753 A | 8/1995 | McGinley et al. | |
| 5,690,981 A | 11/1997 | Watanabe et al. | |
| 5,817,381 A | 10/1998 | Chen et al. | |
| 5,897,905 A | 4/1999 | Bialek et al. | |
| 6,039,998 A | 3/2000 | Sekula et al. | |
| 6,136,363 A | 10/2000 | Bialek et al. | |
| 6,146,672 A | 11/2000 | Gonzalez et al. | |
| 6,217,920 B1 | 4/2001 | Van Eendenburg et al. | |
| 6,231,913 B1 | 5/2001 | Schwimmer et al. | |
| 6,322,829 B1 | 11/2001 | McGlynn et al. | |
| 6,787,176 B1 | 9/2004 | Bialek et al. | |
| 6,893,675 B1 | 5/2005 | Jacobson et al. | |
| 7,510,737 B2 * | 3/2009 | Bialek et al. | 426/602 |
| 2002/0009790 A1 | 1/2002 | Christensen et al. | |
| 2002/0197382 A1 | 12/2002 | Kuijpers et al. | |
| 2004/0086626 A1 | 5/2004 | Lundberg et al. | |
| 2005/0074542 A1 | 4/2005 | Lundberg et al. | |

FOREIGN PATENT DOCUMENTS

| | | |
|---|---|---|
| EP | 0 295 865 | 12/1988 |
| EP | 0 477 827 | 4/1992 |
| EP | 0 757 895 | 2/1997 |
| EP | 0 949 295 | 10/1999 |
| EP | 1 285 588 | 2/2003 |
| WO | 01/17376 | 3/2001 |
| WO | 01/78859 | 10/2001 |
| WO | 03/053149 | 7/2003 |

OTHER PUBLICATIONS

International Search Report, PCT/EP2004/011377, date mailed May 19, 2005, 4 pp.
Fischer, Juergen, "Improved fruit fibers' for modern food processing", *Food Ingredients and Analysis International* (2001).
Lowe, B., 1937, Experimental Cookery, John Wiley & Sons, New York, NY, p. 271.
Schwartzberg, H.G., 1992, Physical Chemistry of Foods, Marcel Dekker, Inc., New York, p. 264-265.
Co-pending Application for Aquino et al., U.S. Appl. No. 10/693,475, filed Oct. 24, 2003.

* cited by examiner

*Primary Examiner* — Carolyn A Paden
(74) *Attorney, Agent, or Firm* — Ellen Plotkin

(57) ABSTRACT

An edible emulsion with insoluble fiber is described. The edible emulsion is suitable for use as a base for making reduced oil food products. The reduced oil food products made with the edible emulsion having insoluble fiber have consumer acceptable viscosities and texture and sensorial properties consistent with full fat food products.

12 Claims, No Drawings

LOW CARBOHYDRATE FIBER CONTAINING EMULSION

This application is a continuation of U.S. Ser. No. 10/693,474, filed Oct. 24, 2003 now U.S. Pat. No. 7,510,737.

FIELD OF THE INVENTION

The present invention is directed to an edible emulsion comprising fibers. More particularly, the invention is directed to an edible emulsion comprising insoluble fibers wherein the emulsion preferably comprises less than about 85.0% by weight oil. For example, when the emulsion is employed to make a reduced oil mayonnaise composition, the resulting reduced oil mayonnaise composition unexpectedly has the taste, viscosity and mouthfeel of full oil mayonnaise. Moreover, the edible emulsion comprising insoluble fibers of this invention may, in addition to mayonnaise, be used as a base for dressings, soups, sauces, dips, spreads, fillings, drinks or the like, and for both hot, cold and frozen applications.

BACKGROUND OF THE INVENTION

Edible emulsions are used as a base for many types of food products. Mayonnaise compositions, for example, comprise edible oil-in-water emulsions that typically have between 80 to 85% by weight oil, and egg yolk, salt, vinegar and water. Mayonnaise compositions are enjoyed by many consumers, and particularly, on sandwiches, in dips, with fish and other food applications.

The oil present in the edible emulsions used in such food products is generally present as droplets dispersed in the water phase. In addition to droplet size and the amount of droplets dispersed, the close packing of the oil droplets results in the characteristic rheological behavior of the emulsions used to make the desired food product (e.g., mayonnaise).

Notwithstanding the fact that many consumers enjoy the taste of full fat products, there is an increasing demand for food products prepared from edible emulsions that have less fat and calories than conventional full fat food products.

It is known that attempts have been made to formulate reduced fat and calorie food products, like mayonnaise compositions, but the resulting food products typically do not have the texture and sensorial properties associated with full fat containing products. Such inferior texture and sensorial properties are invariably related to the reduced levels of oil in the edible emulsions used to make reduced fat products.

This invention, therefore, is directed to an edible emulsion comprising insoluble fibers. The edible emulsion comprising insoluble fibers can be used as a base to make a variety of food products, and unexpectedly, results in a food product that has the characteristics of a full fat product when less than the conventional amount of oil is employed. Furthermore, the food products made with the edible emulsion comprising insoluble fibers of this invention have, in addition to excellent texture and sensorial properties, the added health benefits associated with food products containing fiber. Such food products also have the benefit of being substantially free or completely free of carbohydrates; therefor, very desirable to high protein/low carbohydrate dieters.

ADDITIONAL REFERENCES

Efforts have been made for preparing edible emulsions. In U.S. Patent Application No. 2002/0197382 A1, edible oil-in-water emulsions having a reduced content of oil are described.

Other efforts have been made for preparing edible emulsions. In U.S. Pat. No. 6,039,998, freezable and low calorie spoonable dressings with fatty acid esterified propoxylated glycerin compositions are described.

Still other efforts have been made for preparing emulsions. In U.S. Pat. No. 5,690,981, low calorie foodstuffs are described.

None of the additional information above describes an edible emulsion having reduced oil content and insoluble fiber whereby the edible emulsion can be used to make a food product with characteristics that are similar to those of food products comprising edible emulsions containing conventional amounts of oil.

SUMMARY OF THE INVENTION

In a first aspect, the present invention is directed to an edible emulsion comprising:
a) oil;
b) water; and
c) insoluble fibers
wherein the edible emulsion is coarse or smooth.

In a second aspect, the present invention is directed to a method for making a reduced oil food product comprising the edible emulsion of the first aspect of this invention.

In a third aspect, the present invention is directed to the reduced oil food product comprising the edible emulsion of the first aspect of this invention.

Oil, as used herein, means triglycerides, and especially, those that are liquids at room temperature. Water, as used herein, means pure water or a solution thereof. Insoluble fiber means fiber suitable for human consumption and not water soluble whereby when the same is supplied as an additive composition, the additive composition is not more than 50% by weight soluble fiber, based on total weight of soluble and insoluble fiber in the additive composition. Edible emulsion with conventional amounts of oil means an emulsion, not in final food product form, comprising about 80.0-85.0% by weight oil, based on total weight of the edible emulsion. Texture and sensorial properties associated with full fat products means that food products made with the edible emulsions of the present invention unexpectedly have viscosities and mouthfeels consistent with full fat products wherein food products made according to this invention have excellent mouthfeel, are not sticky or tacky as is the case with food products having starch, and breakdown and dissipate in the mouth in a time and manner similar to that of full fat products.

Coarse, as used herein means the insoluble fibers are detectable in the emulsion thereby producing discernible grainy or particle comprising characteristics when in the mouth. Smooth, as used herein, means no discernible grainy or particle comprising characteristics when in the mouth. Reduced oil, as used herein, means a food product with less than about 75.0% by weight oil based on the total weight of the food product. Food product, as used herein, means a product ready for consumption and comprising the edible emulsion of this invention. Substantially free of carbohydrate means less than about 1.0%, and preferably, less than bout 0.5% by weight carbohydrate (e.g., starch) in the food product. Free of carbohydrates means no carbohydrates are present within the food product. Carbohydrates, as used herein, means a sugar, a starch or a gum.

DETAILED DESCRIPTION OF THE PREFERRED EMBODIMENTS

The only limitation with respect to the type of oil used to make the edible emulsion of this invention is that the oil is suitable for human consumption. Illustrative examples of the types of oil which may be used in this invention include, without limitation, those which are liquid at ambient temperature like avocado, mustard, coconut, cottonseed, fish, flaxseed, grape, olive, palm, peanut, rapeseed, safflower, sesame, soybean, sunflower, mixtures thereof and the like.

Other types of oils which may be used in this invention are solid at ambient temperature. Illustrative examples of the oils which are solid at room temperature and suitable for use in this invention include, without limitation, butter fat, chocolate fat, chicken fat, mixtures thereof and the like.

In a preferred embodiment, the oil used in this invention is a liquid at ambient temperature. In a most preferred embodiment, the oil used in this invention is sunflower or rapeseed oil or a mixture thereof.

The amount of oil used in the edible emulsion of this invention is typically more than about 7.5 weight percent and less than about 85.0 weight percent, based on total weight of the edible emulsion. Preferably, the amount of oil employed in the edible emulsion is from about 15.0% to about 80.0%, and most preferably, from about 20.0 to about 60.0% by weight, based on total weight of the edible emulsion and including all ranges subsumed therein.

The water used in this invention can be pure water, tap water, bottled water, deionized water, spring water, or a mixture thereof. Thus, the water used in this invention may be an aqueous solution comprising salts or minerals or both. Typically, water makes up the balance of the edible emulsion and the food product made with the same.

Regarding the insoluble fibers suitable for use in this invention, such fibers are found, for example, in fruits, both citrus and non-citrus. Other sources of the insoluble fibers suitable for use in this invention are vegetables like legumes, and grains. Preferred insoluble fibers suitable for use in this invention can be recovered from tomatoes, peaches, pears, apples, plums, lemons, limes, oranges, grapefruits or mixtures thereof. Other preferred insoluble fibers suitable for use in this invention may be recovered from the hull fibers of peas, oats, barley, soy, or mixtures thereof. Still other fibers which may be employed include those that are plant or root-derived as well as those which are wood-derived. Typically, the edible emulsion of this invention comprises from about 0.5 to about 9.0%, and preferably, from about 1.0 to about 4.0%, and most preferably, from about 1.5 to about 3.0% by weight insoluble fibers, based on total weight of the edible emulsion, and including all ranges subsumed therein. Such insoluble fibers are commercially available from suppliers like J. Rettenmaier and Sohne GMBH under the Vitacel name and Herbstreith & Fox under the Herbacel name. These insoluble fibers typically have lengths from about 25 to about 400 microns, and preferably, from about 50 to 185 microns, and most preferably, from about 100 to about 165 microns, including all ranges subsumed therein. The widths of such fibers are typically between about 3.0 to about 20.0 microns, and preferably, from about 5.0 to about 10.0 microns.

The emulsifier suitable for use in the edible emulsion of this invention often has an HLB of greater than about 8.0, and preferably, greater than about 11.0, and most preferably, from about 12.0 to about 18.0, including all ranges subsumed therein. Illustrative examples of the emulsifier suitable for use in this invention include, without limitation, PEG 20 tristearate, PEG 20 trioleate, PEG 20 monostearate, PEG 20 monooleate, PEG 20 monopalmitate and PEG 20 monolaurate sorbitan, derivatives thereof, mixtures thereof and the like, also made available by ICI Surfactants under the names Tween or Span. The preferred emulsifier employable in this invention is, however, a protein, like fruit, vegetable, milk (e.g., whey) or soy protein, or mixtures thereof. Another preferred protein suitable for use in this invention is phospholipoprotein, and especially, egg yolk derived phospholipoprotein modified with phospholipase A as disclosed in U.S. Pat. No. 5,028,447, the disclosure of which is incorporated herein by reference.

The amount of emulsifier employed in the edible emulsion of this invention is typically from about 0.1 to about 10.0%, and preferably, from about 0.5% to about 8.0%, and most preferably, from about 1.5 to about 6.5% by weight emulsifier, based on total weight of the edible emulsion and including all ranges subsumed therein.

When making the edible emulsion comprising insoluble fibers of the present invention, emulsifier is typically added to the water, or oil or both water and oil. Likewise, the insoluble fibers may also be added to the water or oil, or both water and oil, either before, during or after the addition of the emulsifier. In a preferred embodiment, the insoluble fibers are added before emulsion formation is completed. The resulting water and oil phases can be mixed in a conventional mixer (e.g., under moderate sheer) to produce an edible coarse emulsion suitable for use as a base for food products. Such a coarse emulsion comprises oil droplets wherein at least about 75%, and preferably, at least about 85.0%, and most preferably, at least about 95.0% of all of the oil droplets present in the coarse emulsion have a diameter that is greater than about 25.0 µm, and preferably, greater than about 50.0 µm, and most preferably, between about 45.0 to about 185.0 µm.

If, on the otherhand, an edible emulsion with a smooth texture is desired, optionally, the coarse edible emulsion may be homogenized in, for example, a high pressure homogenizer. The homogenization step is typically carried out under pressures from about 35.0 to about 650.0 bar, and preferably, from about 40.0 to about 600.0 bar, and most preferably, from about 45.0 to about 550.0 bar, including all ranges subsumed therein. Typically, such a homogenization step is carried out at a temperature from about 15.0° C. to about 70° C. (preferably about ambient temperature) and for enough time to produce oil droplets (in the edible emulsion) whereby at least about 80.0% of the total amount of oil droplets in the emulsion have a diameter which is less than about 10.0 µm. In a preferred embodiment, at least about 85.0% of the total amount of oil droplets present in the edible emulsion have a diameter which is less than about 8.0 µm. In an especially preferred embodiment, at least about 95.0% by weight of all oil droplets present within the edible emulsion have a diameter which is less than about 5.0 µm.

It should be noted that the edible emulsion comprising insoluble fibers disclosed herein preferably has an oil-in-water phase. Thus, it is within the scope of this invention for the edible emulsion comprising insoluble fibers to be a single phase emulsion or a multiple phase emulsion, like a water-in-oil-in-water emulsion.

It is particularly noted herein that if heat treatment, like pasteurization, is not desired, the edible emulsion described herein may be acidified in order to inhibit microbiological growth. When acidified, the edible emulsion typically has enough acidulant added so that the pH of the same is from about 2.75 to about 5.75, and preferably, from about 2.85 to about 5.50, and most preferably, from about 3.25 to about 4.25, including all ranges subsumed therein.

There is no limitation with respect to the type of acidulant employed in this invention other than that the acidulant is one which may be used in formulations suitable for human consumption. Illustrative examples of the types of acidulants which may be used in this invention include, without limitation, acetic acid, citric acid, hydrochloric acid, lactic acid, malic acid, phosphoric acid, glucono-delta-lactone, mixtures thereof and the like. In a preferred embodiment, the acidulant employed in this invention is a mixture of hydrochloric or phosphoric acid, and lactic acid, with lactic acid making up no more than about 40.0% by weight of the total weight of the acidulant mixture. It is noted that acidulant may be added before or after the edible emulsion with insoluble fiber is made. In an especially preferred embodiment, however, acidulant is added before the emulsion is made when the desired food product is served heated (e.g., microwave heated).

It is noted that in lieu of oil or in combination with oil, conventional fat substitutes may be used. Preferred fat substitutes employable in this invention include fatty acid-esterified alkoxylated glycerin compositions as well as sucrose fatty acid esters. The former and latter are described in U.S. Pat. Nos. 5,516,544 and 6,447,824, respectively, the disclosures of which are incorporated herein by reference. When employed, such conventional fat substitutes preferably make up at least about 30.0%, and most preferably, at least about 75.0% of the total weight of the oil in the emulsion.

The edible emulsions comprising insoluble fiber may be combined with optional additives to make a food product ready for consumption. Preferred optional additives which may be employed in the food products made with edible emulsion of the present invention include chocolate, nut paste, salt (and other spices and seasonings), vitamins, artificial flavors and colors, fruit puree, preservatives, antioxidants, chelators, meat like ham and bacon bits or particulates, buffering agents, vegetable bits or particulates, fruit bits or particulates, cheese, mixtures thereof and the like. Such optional additives, when used, collectively, do not make up more than about 40.0% by weight of the total weight of the food product.

When preparing the food product ready for consumption, the optional additives may be added to water and/or oil before the edible emulsion comprising insoluble fiber is made, but preferably the optional additives are mixed in after the emulsion is made (especially when the optional additives are large, like fruit or bacon bits). In a preferred embodiment, the resulting food product made with the edible emulsion comprising insoluble fiber of the present invention comprises less than about 75.0%, and preferably, less than about 55.0%, and most preferably, from about 6.0 to about 35.0% by weight oil, based on total weight of the food product and including all ranges subsumed therein.

The preferred preservatives suitable for use in this invention include sodium benzoate, potassium benzoate, potassium sorbate, sorbic acid, benzoic acid, mixtures thereof and the like. Anti-oxidants suitable for use in this invention include a tocopherol, ascorbic acid, ascorbyl palmitate, tertiary-butyl hydroquinone, mixtures thereof and the like. Chelators suitable for use in this invention include EDTA and its salts, citric acid, sodium tripolyphosphate, sodium carbonate, potassium carbonate, mixtures thereof and the like.

The fruit and vegetable bits that may be used in food products comprising the edible emulsion of this invention are typically small enough to fit through the orifice present in a conventional squeeze bottle. The vegetable bits often include peppers, carrots, cabbage, onion, broccoli, mixtures thereof and the like. The fruit bits often include pears, apples, grapes, tomatoes, mixtures thereof and the like.

The cheese suitable for use in this invention can be skim, part skim or full fat cheese. Typical non-limiting examples of the types of cheese (including processed cheese) suitable for use in this invention include gouda, edam, leyden, cheddar, goat, chesire, stilton, mozzarella, cream cheese, brie, feta, tilsit, mixtures thereof and the like. When cheese is employed to make the food product, it is preferred that the same be melted prior to being added to the edible emulsion or any of its precursor phases. Often, the final food product will comprise from about 10.0% to about 35.0% by weight cheese.

It is particularly noted that when the edible emulsion comprising insoluble fiber of the present invention is used in a food product that is served hot (i.e., greater than about ambient temperature), it is preferred that at least about 95.0% of the emulsifier employed is not an egg-based protein. The most preferred emulsifier suitable for use in this invention when a hot food product is desired is a milk protein like whey protein, and especially when the heating source is a microwave oven. When a milk protein like whey protein is employed, it is preferably in the form of a 5.0 to 10.0% aqueous solution which is heated from about 60° C. to about 90° C. (for about 15-45 minutes) and cooled (to about 1.0° C. to 10.0° C.) before being used to make the edible emulsion of this invention. It is also noted that it is within the scope of this invention to refrigerate and/or freeze the food products made with the edible emulsions of this invention, whereby when such food products are thawed to room temperature or heated, they unexpectedly display good emulsion stability (i.e., no visible syneresis).

Still other additives which may be optionally added to the food products of this invention include protein sources and sweeteners. The former include caseinate and skimmed milk powder and the latter include syrups, sucrose, glucose, saccharin, aspartame, dextrose, lactose, levelose, maltose, fructose, mixtures thereof and the like.

The viscosity of the food products made with the edible emulsion comprising insoluble fiber as disclosed herein is typically greater than about 3,000 and less than about 150,000 centipoise. When a sauce or pourable dressing is, for example, the desired food product, the viscosity of the food product is preferably from about 4,000 to about 10,000 centipoise, and most preferably, from about 4,350 to about 6,000 centipoise.

When the desired food product is, for example, a filling, dip or spoonable dressing, the viscosity of the food product is preferably from about 12,000 to about 120,000 centipoise, and most preferably, from about 16,000 to about 80,000 centipoise, whereby the viscosity of the food product is measured on a Haake Rheometer (Rotovisco RV20) at room temperature using a set of concentric cylinders (or bob-in-cup) with a 1 mm gap, the bob having a diameter of 1.0 cm and length of 1.0 cm. The inner cylinder or bob starts rotating from 0 shear and ramps up to a shear rate of 134 $sec^{-1}$ in 542 sec. By way of comparison, the viscosity values refer to the shear rate of 10 $sec^{-1}$.

It has been unexpectedly discovered that the food products made with the edible emulsion of this invention maintain viscosities that are consistent with full fat products, even when substantially no (<about 1.0% by weight of the food product) thickening gums and/or stabilizers (like starch or gellable or non-gellable gums) are employed. In an especially preferred embodiment, the food products made according to the present invention have, collectively, less than 0.5% by weight gum and/or stabilizer, and most preferably, from about 0.1 to about 0.3% by weight stabilizer and/or gum, where the stabilizer is often selected from the group consisting of, for example, cornstarch, waxy maize, potato, rice, tapioca, or wheat starch and the gum is often selected from the group consisting of, for example, guar, xanthan, agar, carrageen and carboxymethyl cellulose.

The packaging for the food products comprising the edible emulsion of this invention is often a glass jar, food grade sachet or squeezable plastic bottle. Sachets are preferred for food service applications, and a plastic bottle is preferred for domestic use. It is also within the scope of this invention to encapsulate the food products described herein in a pastry-, bread-, or crescent-like dough (e.g., flour, semolina and/or potato comprising) based casing, especially when the food based product has a viscosity of greater than about 60,000 centipoise. When encapsulated in such a dough, the filling typically makes up from about 20.0 to about 50.0% by weight of the encapsulated food product.

The examples which follow are provided to facilitate an understanding of the present invention. The examples are not intended to limit the scope of the claims.

EXAMPLE 1

Low Oil Mayonnaise food products having the edible emulsion comprising insoluble fiber of this invention were made by mixing the following phases:

| Ingredient | Percent by Weight** |
|---|---|
| A. Tap water | 53.0-55.0 |
| Sugar | 2.40-3.10 |
| Salt | 2.00-2.50 |
| EDTA | 0.007-0.008 |
| Potassium sorbate | 0.08-0.12 |
| B. Modified egg yolk | 2.50-3.00 |
| Pasteurized egg white | 2.25-2.75 |
| C. Vinegar (10%) | 1.8-2.2 |
| Lemon juice | 0.04-0.06 |
| Lactic acid (80%) | 0.10-0.22 |
| D. Rapeseed oil | 29.0-31.0 |
| Mustard oil | 0.002-0.003 |
| E. Citrus fiber* | 1.80-2.20 |
| Xanthan [RD] | 0.10-0.30 |

*AQ + F Plus, as made commercially available by Herbstreith & Fox
**Percent by weight of food product An aqueous phase (A), egg phase (B), and acid phase (C) were mixed with an oil phase (D) and xanthan/fiber phase (E) under moderate shear, at atmospheric pressure and ambient temperature in a conventional mixer to produce a coarse emulsion. The coarse emulsion was then subjected to a homogenizer (e.g., APV Gaulin Homogenizer) pressurized to about 200 bar and at about 20° C. The resulting smooth emulsion was filled into glass jars:

The low oil mayonnaise compositions had viscosities of about 25,000 centipoise and pH values of about 3.4

EXAMPLE 2

Fillings having the edible emulsion comprising fiber of this invention were made with the following ingredients:

| Ingredient | Percent by Weight*** |
|---|---|
| Cold set whey (10% solution) | 6.3-6.9 |
| Skimmed milk powder | 3.3-3.7 |
| Sunflower oil | 18.0-22.0 |
| Herbacel Citrus Fiber**** | 2.30-2.60 |
| Cheddar cheese | 23.0-26.0 |
| Water | 40.0-44.0 |

***Based on total weight of the filling
****Made commercially available by Herbstreith & Fox The cold set whey was heated to about 85° C. for about 30 minutes, then cooled to about 5° C. Water, at about room temperature, was combined with the cold set whey as was skimmed milk, sunflower oil and melted cheese. Lactic acid was added to the resulting mixture to adjust the pH to about 5.5, producing an acidic emulsion. Citrus fiber was added to the acidic emulsion and gently dispersed in the same. The resulting coarse emulsion was homogenized in an APV Gaulin Homogenizer, pressurized to about 200 bar and at a temperature of about 20° C. Low oil comprising cheese fillings having a viscosity of about 100,000 centipoise were produced.

EXAMPLE 3

Low oil mayonnaise compositions similar to those prepared in Example 1 were assessed for mouthfeel and compared to commercially available low oil (i.e., 30%) mayonnaise compositions comprising starch and commercially available high oil (e.g., 77%) mayonnaise compositions.

The in-mouth breakdown profile of the mayonnaise compositions was assessed by an expert taster. During the assessment, 2.0 ml of sample was introduced into the mouth of the expert taster at time zero and a judgement was made on initial thickness in order to put a potentiometer (Penny & Giles, Model LP 28B/10"/10K) slider at the maximum intensity position. The slider was left at the maximum positions and after cleansing the palate, a second 2.0 ml of sample was introduced and the oral breakdown assessed. Each sample was chewed at 1.0 chew/sec., for 1.0 minute. The results are set forth in Table 1.

TABLE 1

| Mayonnaise Compositions | Time (sec.)/mouthfeel (oral texture)* |
|---|---|
| As described in Example 1 | 0/90; 10/63; 20/40; 30/24; 40/14; 50/5; 60/0 |
| Conventional low oil mayonnaise with starch | 0/62; 10/63; 20/60; 30/45; 40/35; 50/25; 60/20 |
| Conventional high oil mayonnaise | 0/80; 10/58; 20/30; 30/20; 40/14; 50/5; 60/0 |

*90 = thickest mouth sensation at 0 seconds
0 = consumed, completely dissipated from the mouth after 60 seconds The results in the table demonstrate that the initial mouthfeel of low oil mayonnaise compositions made according to this invention, unexpectedly, had an initial mouthfeel similar to that of conventional full fat (high oil) mayonnaise compositions and superior to that of conventional low oil mayonnaise compositions. The results also demonstrate that the mayonnaise compositions made according to this invention, unexpectedly, were not tacky and dissipated from the mouth in a manner similar to that of conventional high oil mayonnaise compositions.

EXAMPLE 4

Filling compositions similar to the ones described in Example 2 were prepared and encapsulated in a standard white flour dough like the dough typically employed to make bread. The resulting encapsulated food products (60.0% by weight dough and 40% by weight filling, having dimensions of about 4 cm×2.5 cm×10 cm) were placed in a freezer to freeze. The resulting frozen encapsulated food products were heated (directly out of the freezer) at normal heat (800 watts) for about 2.5 minutes in a microwave oven. After heating, and unexpectedly, none of the fillings exploded through the dough encapsulant as typically displayed in conventional cheese encapsulated products. Moreover, the fillings, after heating, were surprisingly solid and deplete of syneresis, even at a temperature of about 85° C.

What is claimed is:

1. An edible emulsion comprising:
    a) less than about 75% by weight oil;
    b) water; and
    c) about 0.5 to about 9.0% by weight citrus fibers, wherein said fibers have a length from 25 to 400 microns and a width from 3 to 20 microns;
    d) about 0.1 to about 10.0% by weight emulsifier;
    e) less than 1.0% by weight starch;
    wherein 2 ml of the emulsion will completely dissipate in a mouth of a consumer within 60 seconds;
    wherein the emulsion has a viscosity of about 16,000 centipoise to about 80,000 centipoise; and
    wherein the edible emulsion is an oil-in-water emulsion or a multiple emulsion comprising an oil-in-water phase.

2. The edible emulsion according to claim 1, wherein the oil is avocado, mustard, coconut, cottonseed, fish, flaxseed, grape, olive, palm, peanut, rapeseed, safflower, sesame, soybean, sunflower, butter fat, chocolate fat, chicken fat, or a mixture thereof.

3. The edible emulsion according to claim 1, wherein said edible emulsion comprises from about 7.5% oil.

4. The edible emulsion according to claim 1, wherein the emulsifier has an HLB of greater than about 8.0.

5. The edible emulsion according to claim 1, wherein the edible emulsion is a coarse emulsion comprising oil droplets, further wherein at least about 85.0% of all droplets present have a diameter that is greater than about 8.0 µm.

6. The edible emulsion according to claim 1, wherein the edible emulsion is a smooth emulsion comprising oil droplets, further wherein at least about 95.0% of all oil droplets present are less than 5 µm.

7. The edible emulsion according to claim 1, wherein said edible emulsion is substantially free of starch.

8. The edible emulsion according to claim 1, wherein said edible emulsion is free of starch.

9. A method for making an edible emulsion comprising insoluble fibers comprising the steps:
    a) mixing, in no particular order, oil, water, insoluble fiber, emulsifier, and less than 1% by weight starch to make a coarse emulsion; wherein the insoluble fibers have a length from 25 to 400 microns and a width from 3 to 20 microns; and
    b) recovering the coarse emulsion;
    c) homogenizing the coarse emulsion in a homogenizer pressurized from about 35.0 to about 650.0 bar and at a temperature from about 15° C. to about 70° C. to produce a smooth emulsion; wherein 2 ml of the emulsion will completely dissipate in a mouth of a consumer within 60 seconds;
    d) adding acidulant wherein the acidulant is added before or after the coarse emulsion is made;
    wherein said edible emulsion has a viscosity of about 16,000 centipoise to about 80,000 centipoise; and
    wherein the edible emulsion is an oil-in-water emulsion or a multiple emulsion comprising an oil-in-water phase.

10. A mayonnaise food product comprising the edible emulsion according to claim 1, and further comprising egg.

11. The mayonnaise food product according to claim 10, wherein said food product is substantially free of starch.

12. The mayonnaise food product according to claim 10, wherein said food product is free of starch.

* * * * *